Dec. 2, 1952 R. L. WALLACE, JR 2,620,448

TRANSISTOR TRIGGER CIRCUITS

Filed Sept. 12, 1950 5 Sheets-Sheet 1

TYPE A TRANSISTOR
COLLECTOR CIRCUIT CHARACTERISTICS

VACUUM TUBE TRIODE
PLATE CIRCUIT CHARACTERISTICS

INVENTOR
R. L. WALLACE, JR.
BY Harry C. Hart
ATTORNEY

FIG. 2a

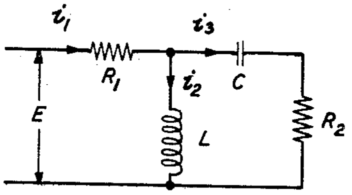

$$R_1 i_1 + jL\omega i_2 = E$$

$$-jL\omega i_2 + \frac{1}{jC\omega} i_3 + R_2 i_3 = 0$$

$$i_1 - i_2 - i_3 = 0$$

WHICH CAN BE WRITTEN $$e_{R_1} + e_L = E$$

$$-e_L + e_C + e_{R_2} = 0$$

$$i_1 - i_2 - i_3 = 0$$

FIG. 2b

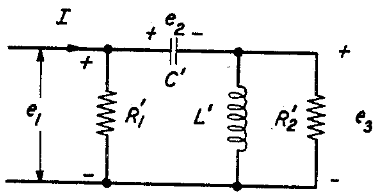

$$\frac{e_1}{\left(\frac{r^2}{R_1}\right)} + \frac{e_2}{\frac{r^2}{jL\omega}} = I$$

$$-\frac{e_2}{\left(\frac{r^2}{jL\omega}\right)} + \frac{e_3}{jr^2C\omega} + \frac{e_3}{\left(\frac{r^2}{R_2}\right)} = 0$$

$$e_1 - e_2 - e_3 = 0$$

WHICH CAN BE WRITTEN $$i_{R_1}' + i_C' = I$$

$$-i_C' + i_L' + i_{R_2}' = 0$$

$$e_1 - e_2 - e_3 = 0$$

WHEN $$R_1' = \frac{r^2}{R_1}$$

$$C' = L/r^2$$

$$L' = r^2 C$$

$$R_2' = r^2/R_2$$

INVENTOR
R. L. WALLACE, JR.
BY Harry C. Hart
ATTORNEY

FIG. 3a

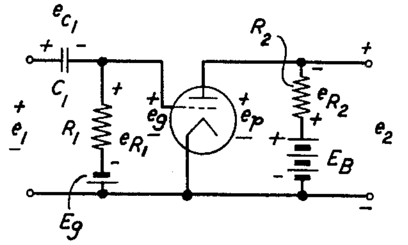

$$e_1 = e_{C1} + e_{R_1} - E_g$$
$$e_g = e_{R_1} - E_g$$
$$E - e_{R_2} = e_p$$
$$e_2 = e_p$$

FIG. 3b

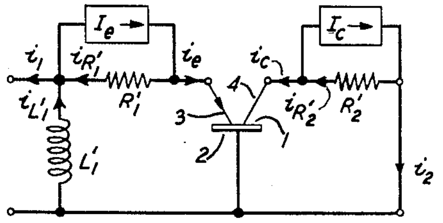

$$i_1 = i_{L_1'} + i_{R_1'} - I_e$$
$$-i_e = i_{R_1'} - I_e$$
$$I_c - i_{R_2'} = -i_c$$
$$i_2 = -i_c$$
$$R_1' = r^2/R_1$$
$$R_2' = r^2/R_2$$
$$L_1' = r^2 C_1$$

FIG. 3c

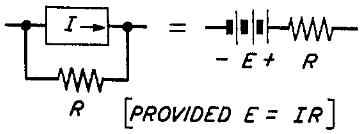

[PROVIDED E = IR]

FIG. 4a

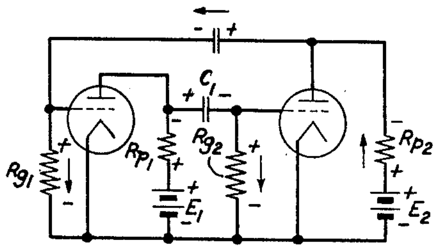

$$e_{Rg_1} = e_{g_1}$$
$$E_1 - e_{Rp_1} = e_{p_1}$$
$$e_{p_1} = e_{C_1} + e_{Rg_2}$$
$$i_{Rp_1} = i_{C_1} + i_{p_1}$$
$$i_{C_1} = i_{g_2} + i_{Rg_2}$$
$$e_{Rg_2} = e_{g_2}$$
$$E_2 - e_{Rp_2} = e_{p_2}$$
$$e_{p_2} = e_{C_2} + e_{Rg_1}$$
$$i_{Rp_2} = i_{C_2} + i_{p_2}$$
$$i_{C_2} = i_{g_1} + i_{Rg_1}$$

FIG. 4b

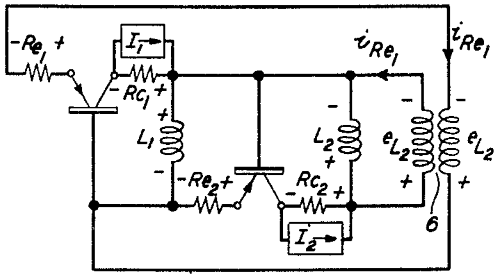

$$i_{Re_1} = -i_{e_1}$$
$$I_1 - i_{Rc_1} = -i_{C_1}$$
$$-i_{C_1} = i_{L_1} + i_{Re_2}$$
$$e_{Rc_1} = e_{L_1} - e_{C_1}$$
$$e_{L_1} = -e_{e_2} + e_{Re_2}$$
$$i_{Re_2} = -i_{e_2}$$
$$I_2 - i_{Rc_2} = -i_{C_2}$$
$$-i_{C_2} = i_{L_2} + i_{Re_1}$$
$$e_{Rc_2} = e_{L_2} - e_{C_2}$$
$$e_{L_2} = -e_{e_1} + e_{Re_1}$$

INVENTOR
R. L. WALLACE, JR.
BY Harry C. Hart
ATTORNEY

Dec. 2, 1952 R. L. WALLACE, JR 2,620,448
TRANSISTOR TRIGGER CIRCUITS
Filed Sept. 12, 1950 5 Sheets-Sheet 4

INVENTOR
R. L. WALLACE, JR.
BY Harry C. Hart
ATTORNEY

INVENTOR
R. L. WALLACE, JR
BY
Harry C. Hart
ATTORNEY

Patented Dec. 2, 1952

2,620,448

UNITED STATES PATENT OFFICE 2,620,448

TRANSISTOR TRIGGER CIRCUITS

Robert L. Wallace, Jr., Plainfield, N. J., assignor to Bell Telephone Laboratories, Incorporated, New York, N. Y., a corporation of New York Application September 12, 1950, Serial No. 184,458

13 Claims. (Cl. 307—88)

This invention relates to transistor translating circuits.

The general objects of the invention are to provide novel transistor circuits, and particularly transistor trigger circuits, of improved performance. Those of the transistor circuits so provided which are chosen for illustration exemplify the central principle of the invention and the design principles according to which not only these illustrative circuits but many others, too, are derived and may be constructed.

Another particular object of the invention is to provide an improved transistor pulse generator circuit.

The transistor, which is the subject of a patent application of John Bardeen and W. H. Brattain, Serial No. 33,466 filed June 17, 1948, now Patent 2,524,035, issued October 3, 1950, is a three-electrode device capable of amplifying electric signals. Upon the announcement of the invention of the transistor, it was generally treated as analogous to a vacuum tube and efforts were made to amplify and otherwise translate electric signals by means of conventional circuits whose performance in connection with vacuum tubes has become well known, the only change made being to substitute a transistor for the vacuum tube. These efforts were often of doubtful success, and the reason was believed to be that the transistor was at best a very imperfect analog of the vacuum tube.

Among the various points of departure of the transistor from perfect analogy with the vacuum tube, those principally remarked upon have been its low input impedance and the fact that it is essentially a current-operated device, as compared with the high input impedance and voltage operation of the vacuum tube triode. It was believed that such points of dissimilarity constituted defects, perhaps temporary only, in the transistor, and it was hoped that improvements in fabrication procedures would result in transistors which should be more nearly perfect analogs of the vacuum tube, in which case improved performance in conventional circuits might be expected. At the same time a number of novel circuits were constructed which appeared to take advantage of the peculiar characteristics of the transistor, but the search for such new circuits was necessarily conducted in a somewhat haphazard fashion.

The present invention is based upon the realization that the transistor approximates the dual counterpart of a vacuum tube triode much more closely than it approximates the analog of the tube, and that, in fact, it approximates the tube dual very closely indeed; and that this duality relation holds not only in a qualitative sense but in a quantitative sense as well, as may be immediately seen by comparison of the transistor collector voltage-current characteristics for various values of emitter current with the tube anode current-voltage characteristics for various values of the grid voltage. Thus, generally speaking, the more imperfect the parallel on the analogy basis, the more reliable and complete is the parallel on the duality basis.

The invention is further based upon the realization that when excellent performance is known to be obtainable from a particular circuit configuration of which a vacuum tube is a part, then comparable performance can be expected from a transistor circuit which is the dual of the known vacuum tube circuit, and of which the transistor, itself an approximate dual of the vacuum tube, forms a part.

As an example of the application of the foregoing principles, and incidentally one in connection with which they were early put to the test, consider a two-tube trigger circuit such as a conventional vacuum tube multivibrator in which the anode of each tube is coupled to the grid of the other tube by way of a condenser. Transistor multivibrators have been constructed employing condenser coupling from collector to emitter but their performance has generally not been satisfactory. Some of the difficulties in the way of satisfactory performance are discussed in an article published in vol. 10 of the RCA Review for December 1949, page 459. On the other hand, when the design of a transistor trigger circuit was approached by way of the duality principle, this approach led to the discovery that the interstage coupling by way of inductive elements was more suitable than capacitative coupling. Transistor trigger circuits so constructed have given excellent performance.

The invention will be fully apprehended from the following detailed description of the principles upon which it is based and of certain specific embodiments thereof taken in connection with the appended drawings, in which:

Figs. 1*a* and 1*b* show a family of conventional vacuum tube voltage-current characteristics and a family of transistor current-voltage characteristics, placed side by side for comparison;

Figs. 2*a* and 2*b* are circuit diagrams showing two passive networks each of which is the dual of the other, together with their defining equations;

Fig. 3*a* is a schematic circuit diagram showing a conventional vacuum tube amplifier while Fig. 3*b* shows its dual counterpart, a transistor amplifier, the defining equations of each being set forth side by side for comparison;

Fig. 3*c* is a diagram illustrating the equivalence of Thevenin's theorem.

Fig. 4*a* is a schematic circuit diagram of a pair of vacuum tube amplifiers coupled together in cascade, the output of the second being coupled back to the input of the first, while Fig. 4*b* is a schematic circuit diagram showing a transistor network which is the dual counterpart of Fig. 4*a*, the defining equations of each being set forth side by side for comparison;

The principle of duality, which for general purposes is well explained by E. A. Guillemin in "Communication Networks" (Wiley, 1935), vol. 2, pages 246 and following, arises from a recognition that the following pairs of equations are mutually reciprocal in nature:

$$e=Ri \qquad i=Ge$$

and $$e=L\frac{di}{dt} \qquad i=C\frac{de}{dt}$$

where all of the symbols have their conventional meanings. Any quantity which in this sense is the reciprocal of another quantity is said to be the dual of that quantity. These equations, taken in pairs, are duals, and they show that complete duality exists between voltage, current, and the electric circuit elements. We have

| Quantity | Dual Quantity |
|---|---|
| Voltage<br>Resistance<br>Inductance | Current<br>Conductance<br>Capacitance |

Figure 1B:
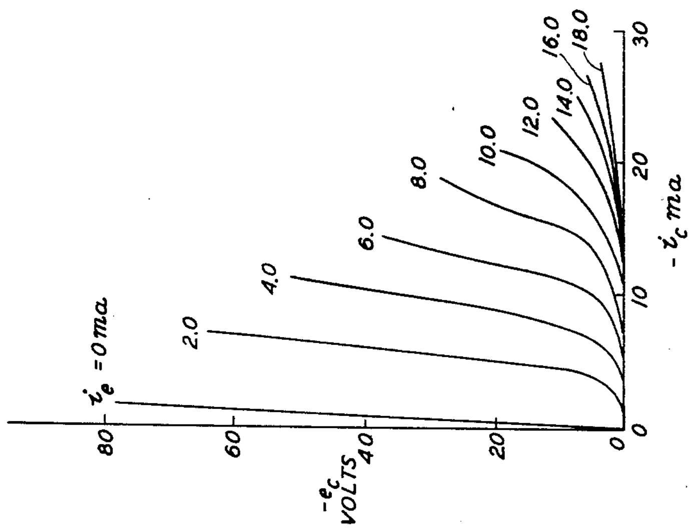
Figure 1A:
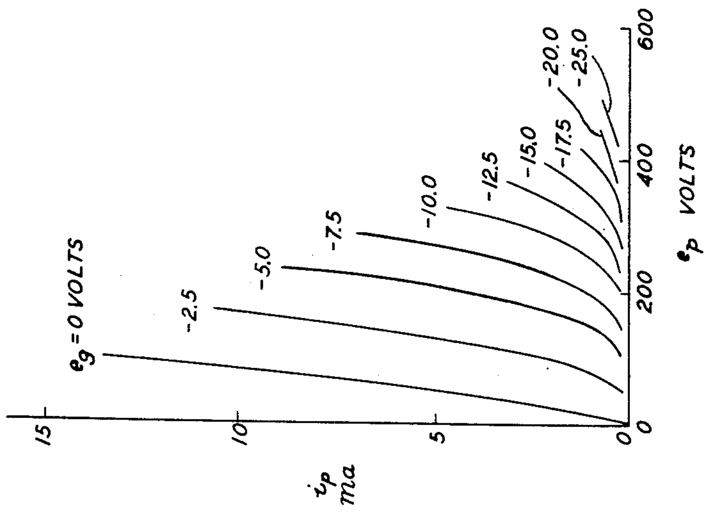

The vacuum tube is essentially a voltage amplifying device while the transistor is essentially a current amplifying device. This fact, which has been recognized for some time, hints that the relation between vacuum tubes and transistors is not one of similarity but rather of duality; that is, that the roles of current and potentials in the transistor are just interchanged by comparison with their roles in the vacuum tube. Figs. 1*a* and 1*b* illustrate and confirm this statement. They show a family of static characteristics of a vacuum tube, as widely published in texts and handbooks, plotted beside a corresponding family of N-type transistor characteristics, as published, for example, by R. M. Ryder and R. J. Kircher in "Some circuit aspects of the transistor," Bell System Technical Journal, July 1949, page 367 (vol. 28). When the axes are chosen in the manner shown, the two families of curves are almost identical in shape. The quantities which behave similarly are $$e_p \text{ and } -i_c$$
$$i_p \text{ and } -e_c$$
$$-e_g \text{ and } i_e$$

and, approximately, $$-i_g \text{ and } e_e$$

The consistent difference in sign is of no significance with respect to duality considerations because it could be removed by a reversal of all the sign conventions for the transistor; and in fact the signs are all reversed for a P-type transistor. Comparison of the two families of characteristics of Figs. 1*a* and 1*b* indicates that the transistor collector circuit is an approximate dual of the vacuum tube plate circuit and that the emitter circuit is an approximate dual of the vacuum tube grid circuit. In particular, they show that the base, the emitter and the collector electrodes of the transistor correspond, duality-wise, to the cathode, the grid, and the anode of the tube.

Now that this dual relationship has been found, a problem arises as to what it means with respect to the design and performance of transistor translating circuits. Since the transistor is not so much the analog of the vacuum tube as its dual, it may be supposed that transistor circuits should not be similar to vacuum tube circuits but rather dual to them. This implies that if it is desired to duplicate, with a transistor, the performance of a known vacuum tube circuit, what is called for is not merely to remove the vacuum tubes and replace them with transistors but rather to first alter the circuit in such a way that the roles of currents and potentials are interchanged in all the passive elements of the circuit as well as in the active ones.

After such circuits have been found, the operating biases should be chosen in such a way as to take into account the following dual situations, stated with respect to N-type transistors: (With P-type transistors, the signs of all biases are to be reversed.)

I. Biasing the vacuum tube grid positively with respect to its cathode so that grid current begins to flow corresponds to biasing the transistor emitter negatively with respect to its base so that negative emitter potential beings to increase.

II. Biasing the vacuum tube grid sufficiently negative to reduce anode current essentially to zero corresponds to biasing the transistor emitter sufficiently positive to reduce collector voltage essentially to zero.

III. Biasing the vacuum tube anode negatively so that anode current is reduced to zero corresponds to biasing the transistor collector positively so that the collector voltage is reduced approximately to zero.

*The dual of a simple ladder network*

The foregoing may be illustrated by the design of the dual of the simple ladder network of Fig. 2*a*. The first step in finding the dual is to write down the Kirchoff equations for the circuit. These are $$R_1i_1+jL\omega i_2=E$$
$$-jL\omega i_2+(1/jC\omega)i_3+R_2i_3=0 \quad (1)$$

and $$i_1-i_2-i_3=0$$

Now, in these equations every $i$ is to be replaced by $e/r$ and every $e$ by $ri$. The quantity $r$ is a constant of the transformation which in this case can be given any positive or negative value. The effect of $r$ is to determine how many volts in the dual circuit are equivalent to one ampere in the original. If the circuit includes a vacuum tube then the value of $r$ is fixed by the relation between the vacuum tube quantities and the corresponding quantities of the transistor which is to replace the tube. In this case $$r^2=r_cr_p \quad (2)$$

where $r_c$ is the collector resistance of the transistor and $r_p$ is the plate resistance of the vacuum tube.

When Equations 1 are transformed as indicated, they become $$\frac{e_1}{(r^2/R_1)}+\frac{e_2}{(r^2/jL\omega)}=I-$$
$$\frac{e_2}{(r^2/jL\omega)}+\frac{e_3}{(jr^2C\omega)}+\frac{e_3}{(r^2/R^2)}=0 \quad (3)$$

These are the equations which apply to the dual circuit. A circuit which will fit them must now be found. To do so, it may be noted that the term $e_1/(r^2/R_1)$ denotes the current through a resistance of value $R_1'=r^2/R_1$, provided $e_1$ is interpreted as the voltage drop across this resistance. The dual circuit must then contain this resistance $R_1'$ with a voltage drop $e_1$ across it. Carrying this reasoning through for the other terms in the first two of Equations 3 leads to the conclusion that the dual circuit contains the following elements:

$$R_1'=r^2/R_1$$
$$R_2'=r^2/R_2$$
$$C'=L/r^2 \quad (4)$$
$$L'=r^2C$$

From the foregoing it may be seen that in passing from any circuit to its dual, every voltage is replaced by a current, every current by a voltage, every resistance by a conductance and vice versa, every inductance by a capacitance and vice versa. Equations 3 can now be written in a simpler notation as follows:

$$i_{R_1'}+i_{C'}=I$$
$$-i_{C'}+i_{L'}+i_{R_2'}=0 \quad (5)$$
$$e_1-e_2-e_3=0$$

where $i_{C'}$ means the current through a capacitance of value C' etc.

All the elements in the dual circuit are now known and the Kirchoff equations, (5), tell how these elements must be connected together; i. e. they are to be interconnected as shown in Fig. 2*b*.

The notation employed in Equations 5 is a very useful one, and now that more is known about how the transformation will turn out, a substantial saving of effort can be effected by applying this same notation to the original equations, (1).

Let $e_L$ stand for the voltage across L (measured in such a direction that $i_L$ flows from + to −) and let a similar notation be employed for every $e$. Equations 1 and their duals thus become $$e_{R_1}+e_L=E$$
$$-e_L+e_C+e_{R_2}=0$$
$$i_{R_1}-i_L-i_C=0$$
$$i_C=i_{R_2} \quad (6)$$
$$i_{R_1'}+i_{C'}=I$$
$$-i_{C'}+i_{L'}+i_{R_2'}=0$$
$$e_{R_1'}-e_{C'}-e_{L'}=0$$
$$e_{L'}=e_{R_2'}$$

It may be noted that a fourth equation has been added to express the fact that the current through C is the same as that through $R_2$. The need for this can be avoided if the notation is extended somewhat to include terms such as $i_{R_2C}$, which denotes the current which flows through $R_2$ and C and implies that the current through $R_2$ is the same as that through C. The corresponding term in the dual equation then becomes $e_{R_2'L'}$ which denotes the voltage across $R_2'$ and L' and implies that the two voltages are the same.

It can be seen by inspection of Equations 6 that the dual transformation amounts to making the following substitutions:

$$E\rightarrow I$$
$$e_{R_1}\rightarrow i_{R_1'}, e_{R_2}\rightarrow i_{R_2'}$$
$$i_{R_1}\rightarrow e_{R_1'}, i_{R_2}\rightarrow {}_{R_2'}$$
$$e_L\rightarrow i_{C'} \quad (7)$$
$$i_L\rightarrow e_{C'}$$
$$e_C\rightarrow i_{L'}$$
$$i_C\rightarrow e_{L'}$$

It can also be seen from Figs 2*a* and 2*b* that circuit elements in series are transformed into elements in parallel and vice versa, while mesh equations become node equations and vice versa. This holds in general and is of assistance in finding circuits to fit the dual equations.

Furthermore, the input terminals of Fig. 2*b* may be said to correspond, dualitywise, to the input terminals of Fig. 2*a*, while the output terminals of Fig. 2*b* correspond, dualitywise, to the output terminals of Fig. 2*a*; and the same holds for any dual pair of networks each of which has input terminals and output terminals.

*The dual of a single R-C coupled amplifier stage*

The procedure for finding the transistor dual of a circuit which contains a vacuum tube triode is the same as that described for a passive network except that the following additional substitutions must be made:

$$e_p\rightarrow -i_c$$
$$i_p\rightarrow -e_c$$
$$e_g\rightarrow -i_e$$

and $$i_g\rightarrow -e_e \quad (8)$$

Fig. 3*a* shows a vacuum tube amplifier circuit of conventional design and four of the equations which describe it. Fig. 3*b* shows the transformed equations and a transistor circuit which satisfies them. Here, as in other figures to follow, the semi-conductive body of the transistor is represented by a thin rectangle 1, its base electrode by a heavy line 2, its emitter electrode by a thin wire 3 bearing an arrowhead pointed toward the body, and lying at an angle with the body surface, and its collector electrode by another thin wire 4 at an equal and opposite angle but without an arrowhead. As in the case of Figs. 2*a* and 2*b*, the constant voltage source $E_B$ which supplies operating bias voltage to the vacuum tube anode circuit has been transformed into a constant current source $I_c$ which supplies bias current to the transistor collector, and the conventional symbol for a constant voltage source such as a battery is replaced, in Fig. 3b and in other figures to follow, by a conventionalized box containing a capital letter I, designating a constant current, together with a distinguishing subscript and an arrow to indicate its direction of flow. Similarly the grid bias constant voltage source $E_g$ has been transformed into an emitter bias constant current source $I_e$. These constant bias currents are not to be confused with the actual collector and emitter currents. The actual emitter current is in fact equal to the sum of the emitter bias current $I_e$ and the current $i_{R_1}$, which flows through the resistor $R_1'$ connected in parallel with the current source, while the actual collector current is in fact equal to the sum of the collector bias current $I_c$ and the current $i_{R_2}'$, which flows through the resistor $R_2'$, connected in parallel with the current source. These relations are stated mathematically in the second and third equations under the figure.

Now it is well known in electric circuit analysis that the parallel combination of a source of current I with a resistor R is, from the standpoint of external measurements, equivalent to the series combination of a source of voltage E with the same resistor R, provided the magnitude of the voltage source is chosen to satisfy the relation $$E = IR \quad (9)$$

which is known as Thevenin's theorem. This equivalence is depicted in Fig. 3c.

*The dual of a two-stage vacuum tube trigger circuit*

When two vacuum tube amplifier stages such as those of Fig. 3a are coupled together by way of a condenser and the output of the second is coupled back to the input of the first by way of another condenser to form a trigger circuit as shown in Fig. 4a, the coupling imposes the conditions that the anode voltage of the first stage shall be equal to the sum of the voltage drop across the coupling condenser $C_1$ and the voltage applied to the grid of the second stage; and that, in turn, the anode voltage of the second stage shall be equal to the sum of the voltage drop across the coupling condenser $C_2$ and the grid voltage of the first stage. These conditions are concisely stated in the third and eighth equations given below Fig. 4a. The dual situation is to couple two transistor stages like that of Fig. 3b together in such a way that the negative collector current of the first stage shall be equal to the sum of current through an inductance element $L_1$ and the emitter current of the second stage; and that, similarly, the negative collector current of the second stage shall be equal to the sum of a current through an inductance element $L_2$ and the emitter current of the first stage. These conditions are staged in the third and eighth equations below Fig. 4b. The negative sign associated with each of these collector currents constitutes a difference between the third and eighth transistor equations and their vacuum tube counterparts. It arises by reason of the fact that, for any transistor, both the emitter current $i_e$ and the collector current $i_c$ are measured positively when flowing into this transistor, whereas Kirchoff's first law requires, for any point, that the currents flowing away from it be equal to the currents flowing toward it.

The first of these requirements is satisfied by an inversion of the second transistor stage as compared with the first, as illustrated in Fig. 4b, while the second requirement is satisfied by the inclusion of an ideal transformer 6 whose primary winding terminals are connected across the inductance coil $L_2$ while its secondary winding terminals are connected, with appropriate polarity, to the input terminals of the left-hand transistor. Analysis shows that all of the defining equations of Fig. 4b are satisfied by the circuit here schematically shown.

The multivibrator action of the circuit of Fig. 4b may be described as follows: Note first the property of the inductance coils $L_1$ and $L_2$ which act as exceedingly high impedances for any sudden changes of current but which act as essentially short circuits once sufficient time has elapsed for current to build up slowly in them. With this in mind, consider the result of applying a positive pulse of current to the emitter of the left-hand transistor. This produces a sudden increase in collector current of the left-hand transistor which, being unable to flow through the coil $L_1$, flows in the base-to-emitter path of the right-hand transistor where it constitutes a reverse direction emitter current; i. e., in such a direction as to reduce the collector current of the right-hand transistor. Therefore, as the left-hand transistor begins to conduct, the right-hand transistor begins to become non-conducting. Furthermore, this change in the collector current of the right-hand transistor is coupled through the transformer to the emitter of the left-hand transistor in such a way as to cause still more conduction in the left-hand transistor. This action has taken place by virtue of the fact that the coils $L_1$ and $L_2$ have initially prevented any flow of current through them. After the lapse of a time interval determined principally by the relative magnitudes of these coils and the external and internal collector resistances, the impedances offered by these coils are reduced and they become effective short circuits, whereupon the emitter current in the right-hand transistor increases positively causing the collector current of the right-hand transistor to increase. By virtue of the coupling between the right-hand collector and the left-hand emitter, this increase in collector current causes a decrease in the emitter current of the left-hand transistor and thus, when the two coils have become effective short circuits, the right-hand transistor begins to conduct and the left-hand transistor begins to become non-conducting, thus initiating a half cycle of operation similar to the one described above but in the opposite direction. But again, this condition can persist only in a transient fashion while the coils are in their high impedance conditions. In a manner entirely parallel with that described above for the first half cycle of operation, the establishment of steady currents through the coils $L_1$ and $L_2$ and their change from high impedance elements to substantial short circuits operates as a disturbance to initiate a repetition of the first half cycle described above. Thus the circuit is self-oscillating, and continues to run freely at a frequency determined principally by the relative magnitudes of the inductances of the coils $L_1$ and $L_2$ and the resistances connected in series with them.

Figure 5:
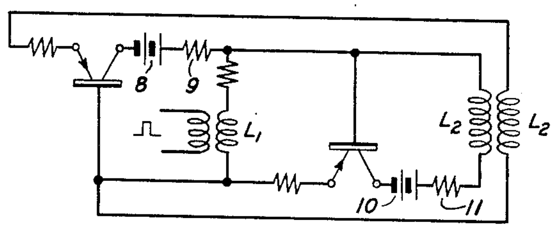
Fig. 5 is a schematic circuit diagram of a practical realization of the circuit of Fig. 4*b*.

While the duality approach leads directly to the employment of the transformer, circuit analysis of the conventional variety shows that the combination of the inductance element $L_2$ and the ideal transformer may be substituted for by a single transformer which is now no longer ideal but of which the self-inductance of the primary winding is the same as the inductance of the coil of Fig. 4b, while the transformer has a one-to-one turns ratio and unity coupling coefficient. Fig. 5 shows the same trigger circuit as Fig. 4b, simplified to this extent.

Because constant voltage sources are more common and less costly than constant current sources, it is usually preferred, as a practical matter, to realize the transistor current supplies by way of the circuit shown to the right in Fig. 3c, than by the one shown to the left. Furthermore this arrangement involves a smaller consumption of direct-current power in the resistor R. Accordingly, the parallel constant current sources of Fig. 3b are replaced in Fig. 5 by series constant voltage sources 8 and 10, in series with resistors 9 and 11, whose magnitudes satisfy the Relation 9. Just as in the conventional vacuum tube amplifier of Fig. 3a, for high voltage gain at the output terminals the resistor $R_2$ should be of large resistance and the anode voltage supply $E_B$ should be of high potential, so in Fig. 3b, for high current gain the load resistor $R_2'$ should be of low resistance, and the injected current $I_C$ should be large. In Fig. 5 these results are obtained by the use of a low resistance load on each collector circuit (i. e., the emitter circuit of the other transistor) in series with a battery 8 or 10 which satisfies the Relation 9 and a resistor 9 or 11 for controlling the magnitude of the bias current, which resistor, is usually of negligible value.

Figure 6:
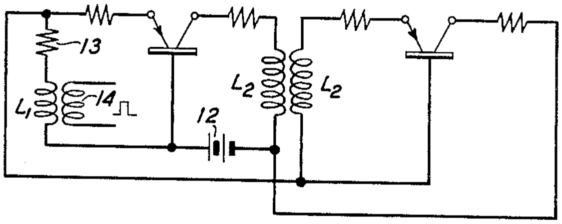
Fig. 6 shows a variant of Fig. 5.

Evidently, by reversing the connections of the transformer, the two transistors may be represented "right side up" at the cost of a crisscross connection. Fig. 6 shows Fig. 5 redrawn in this fashion which is more nearly similar to the fashion in which vacuum tube trigger circuits are commonly represented. In Fig. 6 the collectors of the two transistors are supplied with bias current from a single source 12 instead of from the individual sources of Fig. 5.

The circuits of Figs. 4b, 5, or 6 can be rendered monostable by the inclusion of a resistor 13 in series with the coil $L_1$. This acts to oppose the flow of collector current of the right-hand transistor to its base not only initially as described above for the coil $L_1$ but also in a permanent fashion and to an extent depending only on the magnitude of the resistor and of the current through it and not on time. With this arrangement, the condition of stability is that in which the left-hand transistor is conducting and the right-hand one is cut off. Application of a suitable pulse to an appropriate point, for example a negative pulse to the emitter of the left-hand transistor, initiates a change in these conditions which proceeds for one full cycle in the manner described above but, instead of repeating itself, ceases when the initial condition of stability is again attained.

Like vacuum tube multivibrators, the multivibrators of Figs. 5 and 6, if rendered astable by reduction of the magnitude of the stabilizing resistor 13, may run free as oscillation generators or they may be locked in step with an external source as by the introduction at a suitable point of a synchronizing pulse or train of pulses. While such synchronizing pulses may be introduced at almost any point of the circuit, a convenient point is by way of the coil $L_1$ to which, for this purpose, an input winding 14 is shown coupled and a pulse is indicated as being applied to this input winding.

Figure 7:
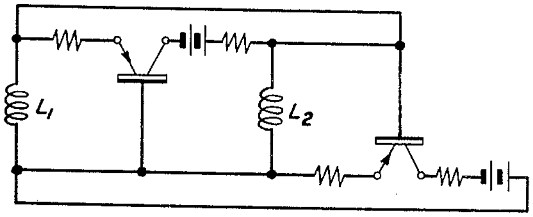
Fig. 7 is a schematic circuit diagram of a two-transistor trigger circuit departing in certain respects from the strict duality relations of Figs. 4*a* and 4*b*.

Various departures from the strictly dual character of the circuit of Fig. 4b are possible. Thus if interstage coupling by way of inductive elements is adhered to while the particular requirement of the eighth defining equation of Fig. 4b is disregarded, the circuit arrangement of Fig. 7 is arrived at, in which the output collector current of the second stage is fed back without the interposition of a transformer to the emitter electrode of the first stage but in inverse phase. This circuit embodies feedback of two kinds as may be illustrated from the following consideration. If the collector of the right-hand transistor were to cease drawing current, the effect of this cessation would act by way of the inductance coil $L_1$ to increase the current drawn by the emitter of the left-hand transistor and therefore to increase the current drawn by the collector of the same transistor. At the same time, the same cessation of the collector current of the right-hand transistor tends by reason of the positive current feedback which is inherent in each grounded base transistor stage to accelerate and enhance the same effect. The reason for this is that the collector current of the right-hand transistor flows equally through both of the inductance coils $L_1$ and $L_2$.

In Fig. 7, the lower terminals of both inductance coils $L_1$, $L_2$, are directly connected together while the upper terminals of the same coils are also directly connected together. Therefore, these two coils are connected strictly in parallel and can be coalesced into a single coil. When this has been done, the circuit of Fig. 7 may be redrawn as Fig. 8, where now a single coil $L_3$ interconnects the base electrodes of the two transistors while the emitter and collector of each transistor are both connected by way of their individual external resistors to the base electrode of the other transistor.

The manner in which this circuit operates may be explained as follows: Assume that because of some small disturbance the emitter current of either one of the transistors commences to increase. By virtue of the current multiplication factor of this transistor, its collector current increases simultaneously and to a greater extent. A current feedback path is provided directly from the collector to the emitter, and initially the impedance of the coil which is connected between the base of the upper transistor and a point of this path opposes the flow of current through it and so requires a major part of the collector current to return to the emitter, thus still further increasing the collector current and so on, resulting in a regenerative increase of the current of the upper transistor toward a saturation value. Now assume further that this action takes place in the case of the upper transistor. Because of the coupling of the lower transistor in the manner shown, a fraction of this feedback current is diverted from the emitter of the upper transistor and flows in the base-to-emitter path of the lower transistor, where it constitutes a negative emitter current. In exactly the manner described above, this negative emitter current is amplified by the current multiplication factor of this lower transistor and flows in regenerative fashion in its current feedback path. The fraction of the upper transistor feedback current so diverted, while sufficient to promote this regenerative action in the case of the lower transistor, is insufficient to put an end to the regenerative action in the case of the upper transistor.

After the lapse of a time interval determined principally by the relative magnitudes of the inductance of the coil $L_3$ and the internal and external collector resistances, the impedance of the coil $L_3$ is reduced and the collector current of the upper transistor now commences to be by-passed to the base of the upper transistor, thus reducing the current flowing to its emitter and so reducing the regenerative action in the case of the upper transistor. Now that this has occurred, a current is flowing in the coil from its lower terminal toward its upper terminal. A part of this current flows to the base of the upper transistor as described above but another part of it flows to the emitter of the lower transistor and this flow is enforced by the inertial characteristic of the coil. Thus, an increase in the emitter current of the lower transistor is initiated just as was initially assumed for the upper transistor, and the cycle of operations repeats itself as described above with the exception that now the roles of the upper and lower transistors are reversed.

Figure 8:
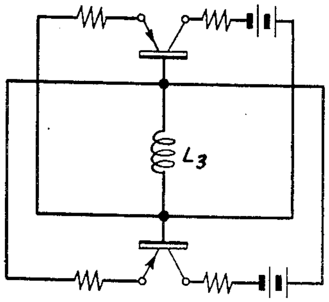
Fig. 8 is the same as Fig. 7 redrawn to emphasize certain features.

As stated above, the circuits of Fig. 7 (or 8) is not strictly the dual of the conventional vacuum tube trigger circuit or multivibrator of Fig. 4*a* and the reason for this is that it does not satisfy the eighth defining equation of Fig. 4*b*. However, it must have a vacuum tube circuit dual, and analysis reveals that the dual of Fig. 8 is in fact a coupled pair of oscillators each stage of which has its own inherent positive feedback while an additional regenerative feedback action is promoted by way of the coupling between them. The dual of Fig. 8 differs principally from the vacuum tube circuit of Fig. 4*a* in that positive feedback around each of the two separate stages must be provided. In the vacuum tube circuit this would require two transformers whereas, as has been shown, in the transistor circuit, the same effect can be obtained more simply and directly.

Figure 9:
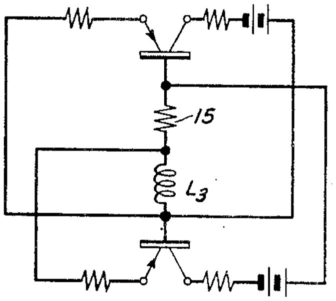
Fig. 9 shows a modification of Fig. 8 including an additional resistor employed to render the circuit monostable.
Figure 10:
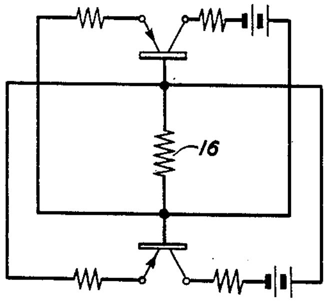
Fig. 10 shows another variant of Fig. 8 in which the coil of Fig. 8 is replaced by a resistor to render the circuit bistable.

The circuit of Fig. 8 can be modified so as to become either monostable or bistable. The required added resistor element 15 for monostability is indicated in Fig. 9 in which the stable condition is conduction in the upper transistor. The circuit can be driven through a single cycle of operation, returning to the same stability condition by the application of a suitable pulse to an appropriate point, for example a negative pulse to the emitter of the upper transistor. The required modification to render the circuit of Fig. 8 bistable is indicated in Fig. 10, in which the coil $L_3$ is entirely replaced by a resistor 16. In this circuit conduction of one of the transistors prevents conduction in the other because the voltage drop across the interbase resistor 16 is in such a direction as to bias one of them for conduction and the other to cut-off or vice versa. Conduction can be switched from one transistor to the other by application of a negative pulse to the emitter of the one which is conducting or of a positive pulse to the emitter of the one which is cut off, or of a pulse having the same effect across the interbase resistor.

Figure 11:
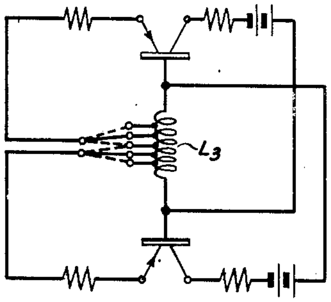
Fig. 11 shows another modification of Fig. 8 including provision for varying the impedance transformation ratio.

The transistor is an amplifying device in which the output impedance is much higher than the input impedance; and hence, if the maximum gain is to be obtained from two transistors coupled in tandem, the coupling should be through a step-down transformer from the high collector impedance of the first transistor to the low emitter impedance of the next. By virtue of such impedance transformation, the gain of each of the two transistors constituting the multivibrator of Fig. 8 can be enhanced and the operation made more positive. The method of obtaining such transformation is particularly simple in this case as is indicated in Fig. 11 where the emitters are returned to taps on the coil $L_3$ between the two transistor bases. The effective impedance transformation can be varied at will by varying the positions of these taps, and the figure shows provision for this by way of a number of taps and a switch which connects the emitter of each transistor to a desired one of these taps to be selected in terms of the impedance transformation which is desired. A particular example would be one in which both emitters are returned to the central tap of the coil providing thereby an impedance transformation of four to one.

Figure 12:
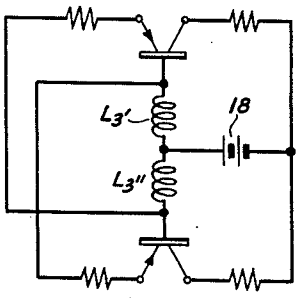
Figs. 12 and 13 show modifications of Figs. 8 and 9 in which a common collector bias potential source is employed for both transistors.

The power supply for the circuit of Fig. 8 may be simplified by the employment of a single potential source 18 for the two transistors as shown in Fig. 12 where the positive terminal of the source 18 is connected to a tap which is common to two inductance windings $L_3'$, $L_3''$ while its negative terminal is connected by way of the individual external collector resistances to the collector electrodes of the two transistors. As before, the emitter of each transistor is connected to the base of the other.

The presence of mutual inductance between the two halves of the coil $L_3'$, $L_3''$ would make for an impedance transformation from collector to emitter which would be in the wrong sense. To avoid this it is preferred to minimize this mutual inductance and accordingly, the interbase impedance of Fig. 12 is shown as comprising two separate inductance coils $L_3'$, $L_3''$ with a common tap.

Figure 13:
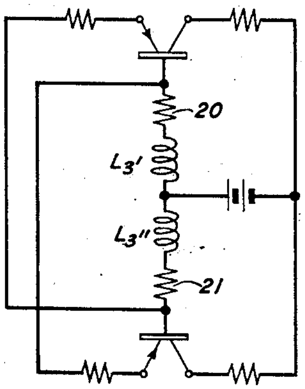

When the simplified power supply arrangement of Fig. 12, which is astable, is employed, the circuit may be rendered either monostable or bistable as desired by the inclusion of additional resistors 20, 21 in series with the base electrodes of the two transistors as shown in Fig. 13. When these two resistors are comparable in magnitude and sufficiently large, the circuit is bistable. When one of these resistors is large while the other is small or entirely omitted, the circuit is monostable.

Various departures may be made in detail from the illustrative embodiments shown and discussed above without departing from the spirit of the invention.

Subject matter which is related to the foregoing is disclosed and claimed in two applications of R. L. Wallace, Jr., both filed September 12, 1950, Serial Numbers 184,457 and 184,459.

What is claimed is:

1. A trigger circuit which comprises a pair of transistors each of which has a semiconductive body, an input electrode, an output electrode, a third electrode, a low impedance feedback path leading from the output electrode to the input electrode, and an impedance element interconnecting the third electrode with a point of the feedback path, said impedance element being common to said two transistors and so connected that current flowing through it flows toward one transistor and away from the other.

2. Apparatus defined in claim 1 wherein said common impedance element comprises an inductance coil.

3. Apparatus as defined in claim 1 wherein said common impedance element comprises a resistor.

4. Apparatus as defined in claim 1 wherein said common impedance element comprises an inductance coil and a resistor.

5. A trigger circuit which comprises a pair of transistors each of which has a semiconductive body, an emitter electrode, a collector electrode, and a base electrode engaging said body, a current feedback path by way of which collector current is fed back to the emitter, and a conductive impedance element having two terminals, one of said terminals being connected to the base electrode of the first transistor and to a point of the feedback path of the second transistor, the other of said terminals being connected to the base of the second transistor and to a point of the feedback path of the first transistor.

6. Apparatus as defined in claim 5 wherein said common impedance element comprises an inductance coil.

7. Apparatus as defined in claim 5 wherein said common impedance element comprises a resistor.

8. Apparatus as defined in claim 5 wherein said common impedance element comprises an inductance coil and a resistor.

9. A trigger circuit which comprises a pair of transistors each of which has a semiconductive body, an emitter electrode, a base electrode and a collector electrode engaging said body, a current feedback path by way of which collector current is fed back to the emitter, and an inductive impedance element connecting the base electrode to a point of said path intermediate the emitter and the collector for transiently enhancing said feedback, said element being common to said two transistors and oppositely phased with respect to them.

10. A trigger circuit which comprises a pair of transistors each of which has a semiconductive body, an emitter electrode, a collector and a base electrode engaging said body, input terminals connected to the base electrode and by way of a first resistor to the emitter electrode, and output terminals connected to the base electrode and by way of a second resistor to the collector electrode, the collector output terminal of the first transistor being connected to the base input terminal of the second transistor, the base output terminal of the first transistor being connected to the emitter input terminal of the second transistor, the output terminals of the second transistor being inductively coupled to the input terminals of the first transistor.

11. In combination with a trigger circuit as defined in claim 10, a transformer furnishing said inductive coupling, said transformer having a primary winding connected to the output terminals of the first transistor and a secondary winding connected to the input terminals of the first transistor.

12. In combination with a trigger circuit as defined in claim 10, a first inductance element interconnecting the output terminals of the first transistor and a second inductance element interconnecting the output terminals of the second transistor.

13. Apparatus whose performance is dual to the performance of a known circuit, which known circuit comprises a vacuum tube having a cathode, a grid, and an anode, and a first network of circuit elements having a first terminal, a second terminal and a third terminal which are connected to said cathode, said grid, and said anode; respectively, said apparatus comprising a transistor having a base electrode, an emitter electrode, and a collector electrode, and a second network of circuit elements which is the dual counterpart of said first network and of which a first terminal, a second terminal, and a third terminal correspond, dualitywise, to the first, the second, and the third terminals of said first-named network, said first, second and third terminals of said second network being connected, respectively, to the base electrode, the emitter electrode, and the collector electrode, of the transistor.

ROBERT L. WALLACE, Jr.

No references cited.